(12) United States Patent
Compton

(10) Patent No.: US 9,953,080 B1
(45) Date of Patent: Apr. 24, 2018

(54) SOCIAL MEDIA DATA MINING FOR EARLY DETECTION OF NEWSWORTHY CIVIL UNREST EVENTS

(71) Applicant: HRL Laboratories, LLC, Malibu, CA (US)

(72) Inventor: Ryan F. Compton, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 509 days.

(21) Appl. No.: 14/295,101

(22) Filed: Jun. 3, 2014

Related U.S. Application Data

(63) Continuation-in-part of application No. 14/210,265, filed on Mar. 13, 2014, now Pat. No. 9,794,358.

(60) Provisional application No. 61/809,160, filed on Apr. 5, 2013, provisional application No. 61/831,058, filed on Jun. 4, 2013.

(51) Int. Cl.
*G06F 17/30* (2006.01)
(52) U.S. Cl.
CPC ................... *G06F 17/30699* (2013.01)
(58) Field of Classification Search
CPC .............. G06F 17/30705; G06F 17/30699
See application file for complete search history.

(56) References Cited

U.S. PATENT DOCUMENTS

| | | | |
|---|---|---|---|
| 2008/0288326 A1* | 11/2008 | Abramowicz | ... G06Q 10/06395 705/7.31 |
| 2011/0125826 A1 | 5/2011 | Erhart et al. | |
| 2012/0330721 A1 | 12/2012 | Volpe et al. | |
| 2013/0041860 A1* | 2/2013 | Lawrence | ............ G06Q 50/01 706/46 |
| 2013/0073336 A1 | 3/2013 | Heath | |
| 2013/0218965 A1 | 8/2013 | Abrol | |
| 2014/0258197 A1* | 9/2014 | Davulcu | ................. G06N 5/02 706/21 |

OTHER PUBLICATIONS

Abel et al., Semantics + Filtering + Search = Twitcident Exploring Information in Social Web Streams, 2012.*

(Continued)

*Primary Examiner* — Syed H Hasan
(74) *Attorney, Agent, or Firm* — Tope-McKay & Associates

(57) ABSTRACT

Described is system for early detection of civil unrest events. A set of textual social media data having corresponding user identifications is received as input. The textual social media data is filtered with a keyword filter, resulting in a first set of data comprising keywords of interest. The first set of data is then filtered with a future date filter, resulting in a second set of data comprising future dates. The second set of data is filtered based on relevance to a civil unrest event with a text classifier module, resulting in a third set of data that is classified based on relevance to the civil unrest event. The third set of data is then filtered based on a location of interest, resulting in a fourth set of data having user identifications in the location of interest. A location is assigned to the civil unrest event, and a forecast of the civil unrest event is output.

23 Claims, 3 Drawing Sheets

(56) References Cited

OTHER PUBLICATIONS

D. Jurgens, "That's what friends are for: Inferring location in online communities based on social relationships," ICWSM, Proceedings of the Seventh international AAAI Conference on Weblogs and Social Media, 2013. pages 273-282.
H. Achreker, A. Gandhe, R. Lazarus, S-H. Yu, and B. Liu, "Predicting flu trends using twitter data," in Computer Communications Workshops (INFOCOM WKSHPS), 2011 IEEE Conference on. IEEE, 2011. pp. 702-707.
M. Paul and M. Dredze, "You are what you tweet: Analyzing twitter for public health," in Fifth International AAAI Conference on Weblogs and Social Media (ICWSM 2011), Proceedings of the Fifth international AAAI Conference on Weblogs and Social Media, 2011, pp. 265-272.
D. Mocanu, A. Baronchelli, N. Perra, B. Gonalves, Q. Zhang, and A. Vespignani, "The twitter of babel: Mapping world languages through microblogging platforms," PLoS One, vol. 6. No. 4, p. e61981, Apr. 2013, pp. 1-9.
A. Tumasjan, T. O. Sprenger, P. G. Sandner, and I. M. Welpe, "Predicting elections with twitter: What 140 characters reveal about poiltical sentiment," in Proceedings of the fourth international AAAI conference on weblogs and social media, 2010, pp. 178-185.
R. Compton, C. Lee, T.-C. Lu, L. D. Silva, and M. Macy, "Detecting future social unrest in unprocessed twitter data," in IEEE Intelligence and Security Informatics (ISI), 2013, pp. 55-60.
B. Mandel, A. Culotta, J. Boutahanis, D. Stark, B. Lewis, and J Rodrigue,"A demographic anatysis of online sentiment during hurricane irene," in Proceedings of the Second Workshop on Language in Social Media. Association for Computational Linguistics, 2012, pp. 27-36.
h t p:// thenextweb.com/2010/01/15/Twitter-geofail-023-tweets-geotagged, taken on Nov. 4, 2014.
J. Mahmud, J. Nichols, and C. Drews, "Where is this tweet from? inferring home locations of twitter users," Proc AAAI ICWSM, Proceedings of the Sixth International AAAI Conference on Weblogs and Social Media, vol. 12, 2012, pp. 511-514.
Y. Takhleyev, A. Gruzd, and B. Wellman, "Geography of twitter networks," Social Networks, vol. 34, No. 1, pp. 73-81, 2012.
D. Mok, B. Wellman, and J. Carrasco, "Does distance matter in the age of the internet?" Urban Studies, vol. 47, No. 13, pp. 2747-2783, 2010.
J. Goldenberg and M. Levy, "Distance is not dead: Social interaction and geographical distance in the internet era," arXiv preprint arXiv:0906.3202, 2009, pp. 1-22.
X. Bresson, T. Laurent, D. Uminsky, and J. H. on Brecht, "Convergence and energy landscape for cheeger cut clustering," Part of: Advances in Neural Information Processing Systems 25 (NIPS 2012). pp. 1394-1402.
A. Szlam and X. Bresson, "Total variation and cheeger cuts," Proceedings of the 27th International Conference on Machine Learning, pp. 1039-1046, 2010.
L. Rudin, S. Osher, and E. Fatemi, "Nonlinear total variation based noise removal algorithms," Physica D: Nonlinear Phenomena, vol. 60, No. 1-4, pp. 259-268, Nov. 1992.
Granovatter, Mark S. "The Strength of Weak Ties." American Journal of Sociology vol. 78, No. 6 (May 1973), pp. 1360-1380.
Y. Vardi and C.-H. Zhang, "The multivariate l1-median and associated data depth," Proceedings of the National Academy of Sciences, vol. 97, No. 4, pp. 1423-1426, 2000.
E. Candes, J. Romberg, and T. Tao, "Stable Signal Recovery from Incomplete and Inaccurate Measurements arXiv: math / 0503066v2 [ math . NA ] Dec. 7, 2005," Science. vol. 40698, pp. 1-15, 2005.
A. Szlam and X. Bresson, "A total variation-based graph clustering algorithm for cheeger ratio cuts," Citeseer, 2010, pp. 1-12.
T. Goldstein and S. Osher, "The Split Bregman Method tor L1-Regularized Problems," SIAM Journal on Imaging Sciences, vol. 2, No. 2, pp. 323-343, 2009.
P. Getreuer, "Total Variation Inpainting using Split Bregman," Image Processing on Line, 2 (2012), pp. 147-157.
L. M. Smith, M. S. Keegan, T. Wittman, G. O. Mohler, and A. L. Bertozzi, "Improving density estimation by incorporating spatial information," EURASIP J. Adv. Signal Process, vol. 2010, pp. 7:1-7:12, Feb. 2010.
T. Goldstein, X. Bresson, and S. Osher, "Geometric Applications of the Split Bregman Method: Segmentation and Surface Reconstruction," Journal of Scientific Computing, vol. 45, No. 1-3, pp. 272-293, Nov. 2009.
A. Chambolle, "An algorithm for total variation minimization and applications," Journal of Mathematical imaging and vision, vol. 20, No. 1-2, pp. 89-97, 2004.
M. Zhu and T. Chan, "An efficient primal-dual hybrid gradient algorithm for total variation image restoration," UCLA CAM Report, pp. 08-34, 2008.
C.-J. Hsieh, K.-W. Chang, C.-J. Lin, S. S. Keerthi, and S. Sundararajan, "A dual coordinate descent method for large-scale linear svm," in Proceedings of the 25th international conference on Machine learning, ACM, 2008, pp. 408-415.
Y. Li and S. Osher, "Coordinate descent optimization for l1 minimization with application to compressed sensing: a greedy algorithm," Inverse Probl. Imaging, vol. 3, No. 3, pp. 487-503, 2009.
J. K. Bradley, A. Kyrola, D. Bickson, and C. Guestrin, "Parallel coordinate descent for L1-regularized loss minimization," in International Conference on Machine Learning (ICML 2011), Bellevue, Washington, Jun. 2011, arXiv:1105.5379, pp. 1-8.
P. Richt'arik and M. Tak'a'c, "Parallel coordinate descent methods for big data optimization," arXiv:1212.0873, 2012, pp. 1-43.
C. Scherrer, A. Tewari, M. Halappanavar, and D. Haglin, "Feature clustering for accelerating parallel coordinate descent," Advances in Neural Information Processing Systems 25, pp. 28-36, arXiv:1212.4174, 2012.
P. Richt'arik and M. Tak'a'c, "Efficient serial and parallel coordinate descent methods for huge-scale truss topology design," in Operations Research Proceedings 2011. Springer, 2012, pp. 27-32.
Rousseeuw, Peter J., and Christophe Croux. "Alternatives to the median absolute deviation." Journal of the American Statistical Association 88.424 (1993), pp. 1273-1283.
Ryan Compton, David Jurgens, David Allen, "Geotagging One Hundred Million Twitter Accounts with Total Variation Minimization," arXiv preprint arXiv: 1404.7152, (2014), pp. 1-9.
S. Ahern, M. Naarnan, R. Nair. and J. H.-I. Yang. World explorer: Visualizing aggregate data from unstructured text in geo-referenced collections. In Proceedings of JCDL '07, pp. 1-10, New York, NY. USA, 2007. ACM.
A. Ahmed, L. Hong, and A. J. Smola. Hierarchical geographical modeling of user locations from social media posts. In Proceedings of the 22Nd International Conference on World Wide Web, WWW '13, pp. 25-36, Republic and Canton of Geneva, Switzerland, 2013. International World Wide Web Conferences Steering Committee.
E. Amitay, N. Har'El, R. Sivan, and A. Softer. Web-a-where: geotagging web content. In Proceedings of SIGIR '04, pp. 273-280. ACM, 2004.
X. Bresson, T. Laurent, D. Uminsky, and J. H. von Brecht. Muitclass total variation clustering. In Advances in Neural Information Processing Systems, 2013.
R. Compton, D. Jurgens, and D. Allen. Geotagging one hundred million twitter accounts with total variation minimization. arXiv preprint arXiv:1404.7152, 2014.
R. Compton, C. Lee, T.-C. Lu, L. De Silva, and M. Macy. Detecting future social unrest in unprocessed twitter data:"emerging phenomena and big data". In Intelligence and Security Informatics (ISI), 2013 IEEE International Conference on, pp. 56-60. IEEE, 2013.
D. J. Crandall, L. Backstrom, D. Huttenlocher, and J. Kleinberg. Mapping the world's photos. In Proceedings of WWW '09, pp. 761-770, New York, NY, USA, 2009. ACM.
J. Gelemter and S. Balaji. An algorithm for local geoparsing of microtext. GeoInformatica, 17(4), pp. 635-667, Jan. 2013.
J. Gelernter, G. Ganesh, H. Krishnakumar, and W. Zhang. Automatic gazetteer enrichment with user-geocoded data. In Proceedings of GEOCROWD '13, pp. 87-94. New York, NY, USA. 2013. ACM.

(56) References Cited

OTHER PUBLICATIONS

T. Goldstein and S. Other. The split bregman method for l1 regularized problems, pp. 1-21.

N. Ireson and F. Ciravegna. Toponym resolution in social media. In Proceedings of ISWC '10, pp. 370-385, Berlin, Heidelberg, 2010. Springer-Verlag.

D. Jurgens, Thats what friends are for: Inferring location in online social media platforms based on social relationships. In Seventh International AAAI Conference on Weblogs and Social. Media, 2013, pp. 273-282.

P. Kelm, V. Murdock, S. Schmiedeke, S. Schockaert, P. Serdyukov, and O. Van Laere. Georeferencing in social networks. In Social Media Retrieval, pp. 115-141. Springer, 2013.

K. Leetaru and P. A. Schrodt. Gdelt: Global data on events, location, and tone, 1979-2012. In Paper presented at the ISA Annual Convention, vol. 2, p. 4, 2013.

K. Leetaru, S. Wang, G. Cao, A. Padmanabhan, and E. Shook. Mapping the global twitter heartbeat: The geography of twitter. First Monday, 18(5), 2013.

J. L. Leidner. Toponym resolution in text: "Which Sheffield is it?". In Proceedings of SIGIR '04, p. 602, 2004.

M. D. Lieberman, H. Samet. and J. Sankaranarayanan, Geotagging with local lexicons to build indexes for textually-specified spatial data. In Proceedings of ICDE10, pp. 201-212, 2010.

J. Mahmud, J. Nichols, and C. Drews. Where is this tweet from? inferring home locations of twitter users, In ICWSM, 2012, pp. 511-514.

K. S. McCurley. Geospatial mapping and navigation of the web. In Proceedings of WWW '01, pp. 221-229, New York, NY, USA, 2001, ACM.

N. O'Hare and V. Murdock. Modeling locations with social media. Inf, Retr., 16(1), pp. 30-62, Feb. 2013.

S. Overall and S. Ru ger. Using co-occurrence models for placename disambiguation. Int. J. Geogr. Inf. Sci., 22(3), pp. 265-287, Jan. 2008.

N. Ramakrishnan, P. Butler, S. Muthiah, N. Self, R. Khandpur, P. Saraf, W. Wang, J. Cadena, A. Vullikanti, G. Korkrmaz, et al. 'beating the news' with embers: Forecasting civil unrest using open source indicators. arXiv preprint arXiv:1402.7035, 2014.

T. Rattenbury and M. Naaman. Methods for extracting place semantics from flickr tags. ACM Trans. Web, 3(1):1:1-1:30, Jan. 2009.

L. Rudin, S. Osher, and E. Fatemi. Nonlinear total variation based noise removal algorithms. Physica D: Nonlinear Phenomena, 60(1-4), pp. 259-268, Nov. 1992.

P. Serdyukov, V. Murdock, and R. Van Zwol. Placing flickr photos on a map. In Proceedings of the 32nd international ACM SIGIR conference on Research and development in information retrieval, pp. 484-491. ACM. 2009.

L. M. Smith, M. S. Keegan, T. Wittman, G. O. Mohler, and A. L. Bertozzi, Improving density estimation by incorporating spatial information. EURASIP J. Adv. Signal Process. 2010:7:1-7:12, Feb. 2010.

O. Van Laere, J. Quinn, S. Schockaert, and B. Dhoedt Spatially aware term selection for geotagging. IEEE Trans. on Knowl. and Data Eng., 26(1), pp. 221-234, Jan. 2014.

O. Van Leere, S. Schockaert, and B. Dhoedt. Finding locations of flickr resources using language models and similarity search. In Proceedings of ICMR '11, pp. 48:1-48:8, New York, NY, USA, 2011. ACM.

Y. Verdi and C. H. Zhang, The multivariate L1-median and associated data depth. Proceedings of the National Academy of Sciences of the United States of America, 97, No. 4 (2000), pp. 1423-1426.

J. Xu, T.-C, Lu, R. Compton. and D. Allen. "Quantifying cross-platform engagement through large-scale user alignment." In Proceedings of the 2014 ACM conference on Web science, pp. 281-282. ACM, 2014.

Y. Yamaguchi, T. Amagasa, and H. Kitagawa. Landmark-based user location inference in social media. In Proceedings of the First ACM Conference on Online Social Networks, COSN '13, pp. 223-234, New York, NY, USA, 2013. ACM.

Z. Yin, L. Cao, J. Han, C. Zhai, and T. Huang. Geographical topic discovery and comparison. In Proceedings of WWW '11, p. 247, New York, New York, USA, 2011. ACM Press.

X. Zhu and Z. Ghahramani. Learning from labeled and unlabeled data with label propagation. Technical report, Technical Report CMU-CALD-02-107, Carnegie Mellon University, 2002.

Cheng, Z.; Caverlee, J.; and Lee, K. (2010) You are where you tweet: a content-based approach to geo-locating twitter users. In Proceedings of the 19th ACM international conference on Information and knowledge management, 759-768. ACM.

Davis Jr, C.; Pappa, G.; de Oliveira, D.; and de L Arcanjo, F. (2011) Inferring the location of twitter messages based on user relationships. Transactions in GIS 15(6):735-751.

Goldenberg, J., and Levy, M. (2009) Distance is not dead: Social interaction and geographical distance in the internet era. arXiv preprint arXiv:0906.3202.

Hecht, B.; Hong, L.; Suh, B.; and Chi, E. (2011) Tweets from Justin bieber's heart: the dynamics of the location field in user profiles. In Proceedings of the 2011 annual conference on Human factors in computing systems, 237-246. ACM.

Ikawa, Y.; Enoki, M.; and Tatsubori, M. (2012) Location inference using microblog messages. In Proceedings of the 21st international conference companion on World Wide Web, 687-690. ACM.

Mahmud, J.; Nichols, J.; and Drews, C. (2012) Where is this tweet from? inferring home locations of twitter users. Proc AAI ICWSM 12.

Mok, D.; Wellman, B.; and Carrasco, J. (2010) Does distance matter in the age of the internet? Urban Studies 47 (13):2747-2783.

Pontes, T.; Vasconcelos, M.; Almeida, J.; Kumaraguru, P.; and Almeida, V. (2012) We know where you live: Privacy characterization of foursquare behavior. In UbiComp '12.

Sadilek, A.; Kautz, H.; and Bigham, J. (2012) Finding your friends and following them to where you are. In Proceedings of the fifth ACM international conference on Web search and data mining, 723-732. ACM.

Zhu, Xiaojin, and Zoubin Ghahramani. Learning from labeled and unlabeled data with label propagation. Technical Report CMU-CALD-02-107, Carnegie Mellon University, (2002).

Vincenty, Thaddeus. Direct and inverse solutions of geodesics on the ellipsoid with application of nested equations. Survey review 23.176 (1975): 88-93.

Ronkainen, Oja, and Orponen. (2003). Computation of the multivariate Oja median. Developments in Robust Statistics, 344-359. http://users.ics.aalto.fi/orponen/papers/ojamed.pdf.

Vardi and Zhang. (2000). The multivariate L1-median and associated data depth. Proceedings of the National Academy of Sciences. 97(4): 1423-6. http://www.pnas.org/content/97/4/1423.full.pdf.

Cheng, Z., et al., "You are where you tweet: a content-based approach to geo-locating twitter users," In Proceedings of the 19th ACM international conference on Information and knowledge management, 2010, pp. 759-768.

PCT International Search Report and the Written Opinion of the International Searching Authority for PCT/US2014/026846, dated Jul. 14, 2014.

Office Action 1 for U.S. Appl. No. 14/210,265, dated Mar. 31, 2016.
Response to Office Action 1 for U.S. Appl. No. 14/210,265, dated Jun. 30, 2016.

Lars Backstrom et al., Find Me If You Can: Improving Geographical Prediction with Social and Spatial Proximity, Apr. 26-30, 2010, World Wide Web Conference Committee, 2010, pp. 1-10.

Clodoveu Davis Jr et al., Inferring the Location of Twitter Messages Based on User Relationships, Nov. 22, 2011, Transactions in GIS, 15, pp. 735-751.

https://www.tumblr.com/about downloaded Dec. 2014.
http://gnip.com/tubmlr/ downloaded Dec. 2014.

Ryan Compton, Craig Lee, Tsai-Ching Lu, Lalindra De Silva, Michael Macy, "Detecting Future Social Unrest in Unprocessed Twitter Data", IEEE International Conference on Intelligence and Security Informatics (ISI), 2013, pp. 56-60.

Sandra Gonzalez-Ballon, Javier Borge-Horthoefer, Alejandro Rivero, Yamir Mareno, "The Dynamics of Protest Recruitment through an Online Network", Nature Scientific Reports, vol. 1, Article 197, Dec. 2011, doi:10.1038/srep00197.

(56) References Cited

OTHER PUBLICATIONS

Ekaterina Stepanova, "The Role of Information Communication Technologies in the 'Arab Sping'", PONARS Eurasia Policy Memo No. 159, 2011.

F. Chen, J. Arredondo, R. P. Khandpur, C.-T. Lu, D. Mares, D. Gupta, and N. Remakrishnan, "Spatial surrogates to forecast social mobilization and civil unrests," Position Paper in CCC Workshop on "From GPS and Virtual Globes to Spatial Computing", 2012.

Ting Hua, Feng Cheng, Liang Zhao, Chang-Tien Lu, Naren Ramakrishnan, "STED: Semi-Supervise Targeted Event Detection", KDD '13 Proceedings of the 19th ACM SIGKDD international conference on Knowledge discovery and data mining, pp. 1466-1469.

David Jurgens, "That's what friends are for: inferring location in online social media platforms based on social relationships", Proceedings of the Seventh International AAAI Conference on Weblogs and Social Media, ICWSM 2013.

Colbaugh, R., Glass, K., "Early Warning Analysis for Social Diffusion Events", IEEE International Conference on Intelligence and Security Informatics, (ISI), 2010, pp. 37-42.

Weng, J., Yao, Y. Leonardi, E., Lee, F., "Event Detection in Twitter,", International Conference on Weblogs and Social Media, 2011.

Weerkamp W., De Rijke, M., "Activity Prediction: A Twitter-based Exploration", SIGIR Workshop on Time-aware Information Access, 2012.

Xu, J., et al., "Civil Unrest Prediction: A Tumblr-Based Exploration," Social Computing, Behavioral-Cultural Modeling and Prediction Lecture Notes in Computer Science vol. 8393, 2014, pp. 403-411.

De Silva, Lalindra, and Ellen Riloff "User Type Classification of Tweets with Implications for Event Recognition." Proceedings of the Joint Workshop on Social Dynamics and Personal Attributes in Social media, pp. 98-108, Baltimore, Maryland USA, Jun. 27, 2014 Association for Computational Linguistics.

X. Zhu and Z. Ghahramani, "Learning from labeled and unlabeled data with label propagation," Technical Report CMU-CALD-02-107, Carnegie Mellon University, Tech. Rep., 2002.

Vincenty, Thaddeus, "Direct and inverse solutions of geodesics on the ellipsoid with application of nested equations," Survey Review 23.176 (1975): 88-93.

Vardi and Zhang, "The multivariate L1-median and associated data depth," Proceedings of the National Academy of Sciences, 97(4): 1423-6, 2000.

Compton et al., "Detecting future social unrest in unprocessed Twitter Data," IEEE Intelligence and Security Informatics, Jun. 4-7, 2013.

H. Kwak, C. Lee, H. Park, and S. Moon, "What is twitter, a social network or a news media?" WWW 2010, Apr. 26-30, 2010.

Office Action 2 for U.S. Appl. No. 14/210,265, dated Oct. 21, 2016.

Response to Office Action 2 for U.S. Appl. No. 14/210,265, dated Jan. 23, 2017.

K. Leetaru and P. Schrodt, "GDELT: Global data on events, location, and tone, 1979-2012," Pap. Present., International Studies Association, ISA, pp. 1979-2012, 2013.

M. T. Malik, A. Gumel, L. H. Thompson, T. Strome, and S. M. Mahmud, "'Google Flu Trends' and Emergency Department Triage Data Predicted the 2009 Pandemic H1N1 Waves in Manitoba," Canadian Journal of Public Health, vol. 102, issue No. 4, pp. 294-297, 2011.

F. Pervaiz, M. Pervaiz, N. Abdur Rehman, and U. Saif, "FluBreaks: early epidemic detection from Google flu trends," J. Med. Internet Res., vol. 14, No. 5, pp. e125-1-e125-16, Jan. 2012.

S. P. O'Brien, "Crisis Early Warning and Decision Support: Contemporary Approaches and Thoughts on Future Research," Defense Advanced Research Projects Agency International Studies Review (Impact Factor: 0.74), 12(1): pp. 87-104, 2010.

6. M. D. Ward, A. Beger, J. Cutler, C. Dorff, and B. Radford, "Comparing GDELT and ICEWS Event Data," vol. 1, pp. 1-10, 2013, Wardlab.

Ward, Michael D et al. 2012. "Geographical Models of Crises: Evidence from ICEWS". In Advances in Design for Cross-Cultural Activities, Part I, Advances in Design for Cross-Cultural Activities, Part I, Dylan D Schmorrow and Denise M Nicholson. Boca Raton, FL: CRC Press, pp. 429-438.

P. A. Grabowicz and V. M. Eguiluz, "Heterogeneity shapes groups growth in social online communities," EPL Europhysics Lett., vol. 97, No. 2, pp. 28002-p1-28002-p5, 2012.

D. Braha, "Global civil unrest: contagion, self-organization, and prediction," PLoS One, vol. 7, No. 10, pp. e48596-1-e48596-9, Jan. 2012.

H. Becker, M. Naaman, and L. Gravano, "Beyond Trending Topics: Real-World Event Identification on Twitter," International Conference on Web and Social Media, ICWSM, pp. 1-17, 2011.

A. Zubiaga, D. Spina, and R. Martinez, "Classifying Trending Topics: A Typology of Conversation Triggers on Twitter," Evaluation. pp. 8-11, 2011.

J. Story, M. Hall, and J. Wickstra, "Discovering Trending Topics on Twitter Via Retweets," Computer (Long. Beach. Calif), 2011, pp. 1-6.

N. Pervin, F. Fang, A. Datta, K. Dutta, and D. Vandermeer, "Fast, Scalable, and Context-Sensitive Detection of Trending Topics Microblog Post Streams," ACM Trans. Manag. Inf. Syst., vol. 3, pp. 1-24, 2013.

L. Aiello, G. Petkos, and C. Martin, "Sensing trending topics in Twitter," IEEE Transactions on Multimedia, vol. 15, No. 6, pp. 1268-1282, 2013.

D. Wilkinson and M. Thelwall, "Trending Twitter topics in English: An international comparison," J. Am. Soc. Inf. Sci. Technol., vol. 63, pp. 1631-1646, 2012.

L. Hong, A. Ahmed, S. Gurumurthy, A. J. Smola, and K. Tsioutsiouliklis, "Discovering geographical topics in the Twitter stream," Proc. 21st Int. Conf. World Wide Web—WWW '12, pp. 769-779, 2012.

D. Jurgens, "That's What Friends Are For: Inferring Location in Online Social Media Platforms Based on Social Relationships," in Proceedings of the Seventh International AAAI Conference on Weblogs and Social Media That's, 2013, pp. 273-282.

L. Hong, A. Ahmed, and S. Gurumurthy, "Discovering geographical topics in the Twitter stream," in Proceedings of the 21st international conference on World Wide Web, pp. 769-778, 2012.

M. Krstajic, C. Rohrdantz, M. Hund, and A. Weiler, "Getting there first: real-time detection of real-world incidents on Twitter," in 2nd Workshop on Interactive Visual Text Analytics: Task-Driven Analysis of Social Media Content with Visweek'12, 2012, pp. 2-5.

T. Kraft, D. X. Wang, J. Delawder, W. Dou, and W. Ribarsky, "Less After-the-Fact: Investigative visual analysis of events from streaming Twitter," 2013 IEEE Symp. Large-Scale Data Anal. Vis., pp. 95-103, Oct. 2013.

S. Ardon, A. Bagchi, A. Mahanti, A. Ruhela, A. Seth, R. M. Tripathy, and S. Triukose, "Spatio-temporal and events based analysis of topic popularity in Twitter," in Proceedings of the 22nd ACM international conference on Conference on information & knowledge management, 2013, pp. 219-228.

R. Compton, C. Lee, J. Xu, L. Artieda-moncada, T. Lu, L. De Silva, and M. Macy, "Using publicly visible social media to build detailed forecasts of civil unrest." Security Informatics, pp. 1-11, 2013.

Manrique, H. Qi, A. Morgenstern, N. Velasquez, T.-C. Lu, and N. Johnson, "Context matters: Improving the uses of big data for forecasting civil unrest: Emerging phenomena and big data," 2013 IEEE International Conference on Intelligence and Security Informatics. IEEE, pp. 169-172, Jun. 2013.

C. A. A. Beauchemin and A. Handel, "A review of mathematical models of influenza A infections within a host or cell culture: lessons learned and challenges ahead," BMC Public Health, vol. 11, No. suppl 1, pp. S7-1-S7-15, 2011.

E. O. Nsoesie, R. J. Beckman, S. Shashaani, K. S. Nagaraj, and M. V Marathe, "A Simulation Optimization Approach to Epidemic Forecasting.," PLoS One, vol. 8, No. 6, pp. e67164-1-e67164-10, Jan. 2013.

L. N. Murillo, M. S. Murillo, and A. S. Perelson, "Towards multiscale modeling of influenza infection," J. Theor. Biol., vol. 332, pp. 267-290, Sep. 2013.

(56) References Cited

OTHER PUBLICATIONS

J.Ginsberg, M. H. Mohebbi, R. S. Patel, L. Brammer, M. S. Smolinski, and L. Brilliant, "Detecting influenza epidemics using search engine query data," Nature, vol. 457, No. 7232, pp. 1012-1015, 2009.

H. A. Carneiro and E. Mylonakis, "Google Trends: A Web-Based Tool for Real-Time Surveillance of Disease Outbreaks," Clin. Infect. Dis., vol. 49, No. 10, pp. 1557-1564, 2009.

A. F. Dugas, et al. "Influenza Forecasting with Google Flu Trends." (2013) PLoS One 8(2): pp. e56176-1-e56176-7. doi:10.1371/journal.pone.0056176.

M. Kang, H. Zhong, J. He, S. Rutherford, and F. Yang, "Using Google Trends for Influenza Surveillance in South China," PLoS One, vol. 8, No. 1, 2013, pp. e55205-1-e55205-6.

X. Zhou, Q. Li, Z. Zhu, and H. Zhao, "Monitoring Epidemic Alert Levels by Analyzing Internet Search Volume," IEEE Trans. Biomed. Eng., vol. 60, No. 2, pp. 446-452, 2013.

K. Wilson and J. S. Brownstein, "Early detection of disease outbreaks using the Internet," CMAJ, vol. 180, No. 8, pp. 829-831, Apr. 2009.

B. M. Althouse, Y. Y. Ng, and D. A. T. Cummings, "Prediction of Dengue Incidence Using Search Query Surveillance," PLoS Negl. Trop. Dis., vol. 5, No. 8, pp. e1258-1-e1258-7, 2011.

P. M. Polgreen, Y. Chen, D. M. Pennock, and F. D. Nelson, "Using internet searches for influenza surveillance," Clin. Infect. Dis., vol. 47, No. 11, pp. 1443-1148, Dec. 2008.

A. Hulth and G. Rydevik, "Get Well: an automated surveillance system for gaining new epidemiological knowledge," BMC Public Health, vol. 11, 2011, pp. 252-1-252-8.

L. Samaras, E. García-Barriocanal, and M.-A. Sicilia, "Syndromic surveillance models using Web data: the case of scarlet fever in the UK," Inform. Health Soc. Care, vol. 37, No. 2, pp. 106-124, Mar. 2012.

X. Zhou, J. Ye, and Y. Feng, "Tuberculosis surveillance by analyzing Google trends," IEEE Trans. Biomed. Eng., vol. 58, No. 8, pp. 2247-2254, Aug. 2011.

Notice of Allowance for U.S. Appl. No. 14/210,265, dated Jun. 8, 2017.

Office Action 1 for Chinese Application No. 201480020049.1, dated May 12, 2017.

Communication regarding European Search Report and the European Search Opinion for European Regional Phase Patent Application 14780262.3, dated Oct. 13, 2016.

Search strategy in the European Search for European Regional Phase Patent Application No. 14780262.3, dated Oct. 13, 2016.

Search Report in the European Search for European Regional Phase Patent Application No. 14780262.3, dated Oct. 13, 2016.

Search Opinion for European Regional Phase Patent Application No. 14780262.3, dated Oct. 13, 2016.

Clodoveu A. Davis Jr. et al: "Inferring the Location of Twitter Messages Based on User Relationships." Transactions in GIS. vol. 15. No. 6. Dec. 22, 2011 (Dec. 22, 2011). pp. 735-751. XP055305589. GB.

David Jurgens: "That's What Friends Are For: Inferring Location in Online Social Media Platforms Based on Social Relationships," Jun. 27, 2013 (Jun. 27, 2013). pp. 273-282. XP055307355. Retrieved from the Internet: URL:http://www.aaai.orgjocsjindex.php/ICWSM/ICWSM13/paperjviewFile/6067/6366 [retrieved on Oct. 4, 2016].

Lars Backstrom et al: "Find me if you can," Proceedings of the 19th International Conference on World Wide Web. WWW '10. Jan. 1, 2010 (Jan. 1, 2010). XP055188728. New York. New York. USA, pp. 61-69.

Tatiana Pontes et al: "Beware of What You Share: Inferring Home Location in Social Networks." Data Mining Workshops (ICDMW). 2012 IEEE 12th International Conference on. IEEE. Dec. 10, 2012 (Dec. 10, 2012). pp. 571-578. XP032303104.

\* cited by examiner

SOCIAL MEDIA DATA MINING FOR EARLY DETECTION OF NEWSWORTHY CIVIL UNREST EVENTS

CROSS-REFERENCE TO RELATED APPLICATIONS

This is a Continuation-in-Part application of U.S. Non-Provisional application Ser. No. 14/210,265, filed in the United States on Mar. 13, 2014, entitled, "Inferring the Location of Users in Online Social Media Platforms Using Social Network Analysis," which is a Non-Provisional patent application of U.S. Provisional Application No. 61/809,160, filed in the United States on Apr. 5, 2013, entitled, "Inferring the Location of Users in Online Social Media Platforms Using Social Network Analysis."

This is ALSO a Non-Provisional patent application of U.S. Provisional Application No. 61/831,058, filed in the United States on Jun. 4, 2013, entitled, "Social Media Data Mining for Early Detection of Newsworthy Civil Unrest Events."

GOVERNMENT LICENSE RIGHTS

This invention was made with government support under U.S. Government Contract Number D12PC000285 Open Source Indicators. The government has certain rights in the invention.

FIELD OF INVENTION

The present invention relates to a system for early detection of civil unrest events and, more particularly, to a system for early detection of civil unrest events using social media data mining.

BACKGROUND OF THE INVENTION

Widespread adoption of social media has made it possible for any individual to rapidly communicate with an audience of thousands (see the List of Incorporated Cited Literature References, Literature Reference No. 1). Unlike traditional media, where several difficult time-consuming steps must be carried out prior to publication, information in social media becomes publicly available within a few seconds of its creation.

With regards to existing social media analysis systems, red24 (red24 plc, Berkshire, UK http://www.red24.com taken on Jun. 2, 2014) is a crisis management assistance system, developed by a company by the same name, which provides security and risk assessment services to its clients. red24's system relies heavily on interaction by highly trained staff and is limited by the amount of data a few humans can process daily. Similarly, Dataminr (http://www.dataminr.com taken on Jun. 2, 2014), developed by Dataminr, Inc. of New York, N.Y., is a real-time social media analytics company with a mission to extract value from social media for clients in the finance and government sectors. Dataminr is limited by the coverage and accuracy of its geocoding approach.

Thus, a continuing need exists for a system for automatic detection of civil unrest events using a geocoding approach with high accuracy.

SUMMARY OF THE INVENTION

The present invention relates to a system for early detection of civil unrest events and, more particularly, to a system for early detection of civil unrest events using social media data mining. The system comprises one or more processors and a memory having instructions such that when the instructions are executed, the one or more processors perform multiple operations. The system receives a set of textual social media data having corresponding user identifications as input. The set of textual social media data is filtered with a keyword filter, resulting in a first set of data comprising keywords of interest. The first set of data is filtered with a future date filter, resulting in a second set of data comprising future dates. The second set of data is filtered based on relevance to a civil unrest event with a text classifier module, resulting in a third set of data that is classified based on relevance to the civil unrest event. The third set of data is filtered based on a location of interest, resulting in a fourth set of data having user identifications in the location of interest. A location is assigned to the civil unrest event, and a forecast of the civil unrest event is output.

In another aspect, the forecast comprises a population element, an event type element, a date element, a location element, and a probability element, wherein the population element describes a demographic of participants of the civil unrest event, the event type element describes a reason for the civil unrest event, the date element describes a date the civil unrest event is forecast to occur on, the location element describes a location where the civil unrest event is expected to occur, and the probability element describes how likely it is that the civil unrest event will occur.

In another aspect, the text classifier module comprises a standard logistic regression classifier trained on the set of textual social media data.

In another aspect, the text classifier module further comprises a user type identification classifier to determine whether a user identification is related to an individual or an organization, and wherein the one or more processors further perform an operation of increasing the probability of the civil unrest event occurring if the user identification is related to an organization.

In another aspect, the system searches the set of textual social media data for mentions of cities or monuments to assign a location to the civil unrest event.

In another aspect, if there are no mentions of cities or monument in the set of textual social media data, the system assigns a location to the civil unrest event using a geocoding module that infers a location of a user identification based on a set of social media relationships within the set of textual social media data.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
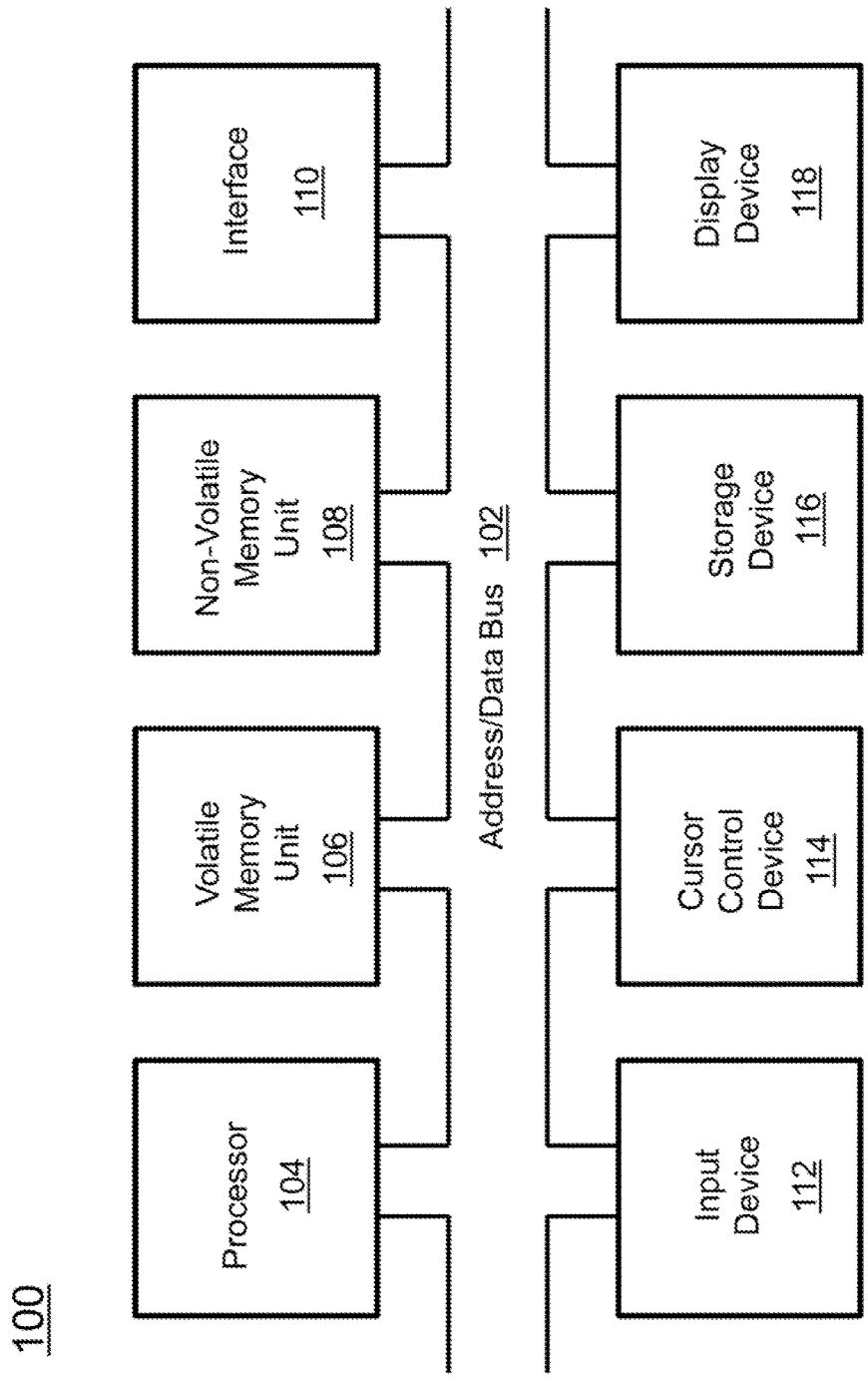
FIG. 1 is a block diagram depicting the components of a system for early detection of civil unrest events according to the principles of the present invention.

The present invention relates to a system for early detection of civil unrest events and, more particularly, to a system for early detection of civil unrest events using social media data mining. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Finally, specific details of the present invention are provided to give an understanding of the specific aspects.

(1) LIST OF INCORPORATED CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. H. Kwak, C. Lee, H. Park, and S. Moon, "What is twitter, a social network or a news media?" WWW 2010, April 26--30, 2010.
2. L. D. Silva and E. Riloff, "Exploiting the textual content of tweets for user type classification," Under review, 2013.
3. X. Zhu and Z. Ghahramani, "Learning from labeled and unlabeled data with label propagation," Technical Report CMU-CALD-02-107, Carnegie Mellon University, Tech. Rep., 2002.
4. Vincenty, Thaddeus, "Direct and inverse solutions of geodesics on the ellipsoid with application of nested equations," Survey Review 23.176 (1975): 88-93.
5. Vardi and Zhang, "The multivariate L1-median and associated data depth," Proceedings of the National Academy of Sciences, 97(4): 1423-6, 2000.
6. Compton et al., "Detecting future social unrest in unprocessed Twitter Data," IEEE Intelligence and Security Informatics, Jun. 4-7, 2013.

(2) PRINCIPAL ASPECTS

The present invention has three "principal" aspects. The first is a system for early detection of civil unrest events. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
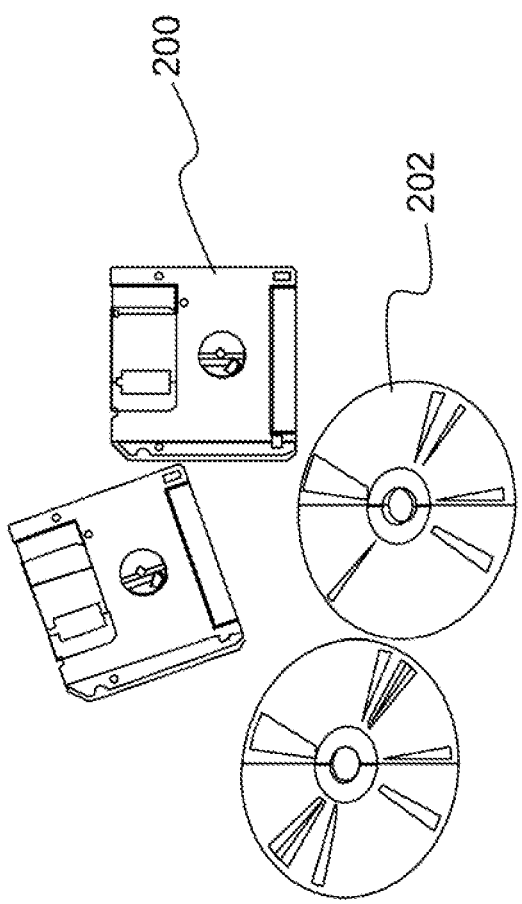
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of"instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF THE INVENTION

Described is a system that "beats the news" by reporting on civil unrest events prior to their occurrence. Social media's accelerated publication speed allows for reporting of events while they are still in their planning stages. This is possible by filtering through the large and dynamic supply of information available publicly on a social media website, such as Twitter™, for messages exhibiting several independent features. Twitter™ is a non-limiting example used only for illustrative purposes, but not intended to be limited thereto.

Early reporting of civil unrest events is valuable for several government and industrial applications. For example, if a port is likely to shut down due to a riot, shipping companies may opt to redirect freight to prevent unexpected losses. As another non-limiting example, if a massive protest is planned to occur in a large metropolitan area, government officials may elect to postpone diplomatic visits in order to ensure the safety of their politicians.

In contrast to traditional news media, the system according to the principles of the present invention relaxes the assumption of perfect accuracy and replaces it with a probability score; this allows a user to report on events prior to their occurrence. Social media allows any user to immediately publish short messages about any topic to a potentially huge audience. No content filtering is applied prior to publication.

The system according to the principles of the present invention automatically filters social media content on social media websites, such as Twitter™, to identify Tweets™ (a message sent using Twitter™) which are likely related to the planning of an upcoming civil unrest event. Following this, the system labels the Tweets™ of interest with a date, location, probability, population, and "event subcode" to make an informative prediction. The prediction can be available immediately after a tweet is posted on line. A lead-time of several days is typical.

Specifically, the detection process of the present invention can be broken down into the application of several filters, which are used to continually monitor streaming data from Twitter™. Below is a table depicting the process of future event detection according to the principles of the present invention.

---
Future Event Detection
---
Input: millions of today's tweets ™ on Twitter ™
Output: a few dozen tweets ™ relevant to upcoming events
$t_1$ = tweets ™ with text containing specific keywords
$t_2$ = tweets ™ in $t_1$ with text containinu future dates
$t_3$ = tweets ™ in $t_2$ which have passed through, text classifier
$t_4$ = tweets ™ in $t_3$ whose retweeters localize within nations of interest or whose text contains mentions of specific locations
return $t_4$
---

Forecasts are generated in the following form:
{population, event_type, date, location, probability}, where "population" represents the demographic of the event participants (e.g., education, labor, agriculture), "event type" gives further detail regarding the reason for the event (e.g., employment, housing, economic policies), "date" is the date the event is forecast to occur on, "location" is the city where we expect the event to occur, and "probability" is how likely it is that the event will actually happen.

For experimental studies, approximately 93 gigabytes (GB) of Twitter™ data were downloaded each day from a GNIP-provided "decahose". This volume of data comprises a 10% sampling of all Tweets™ posted. Data was stored and processed on a 36-node 1008-CPU cluster running Hadoop 0.20.2 produced by Apache™ on all machines. In another aspect, Twitter™ data was obtained by continually querying Twitter™'s rate-limited public application programming interface (API).

Figure 3:
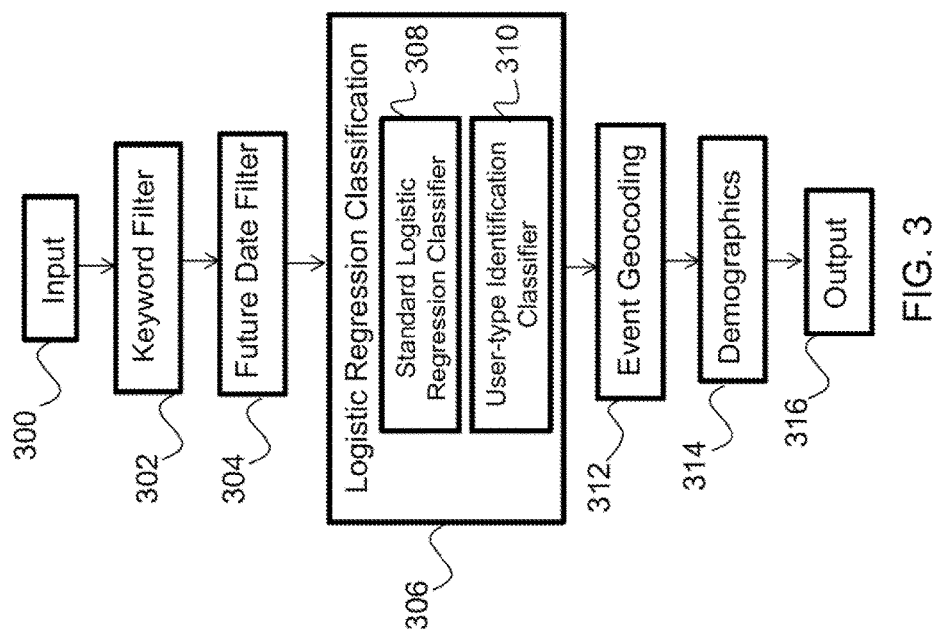
FIG. 3 is a flow diagram depicting a system for early detection of civil unrest events according to the principles of the present invention.

FIG. 3 is a flow diagram depicting a system for early detection of civil unrest events according to the principles of the present invention. In this example, the input 300 comprises millions of a day's Tweets™ on Twitter™; however, other textual inputs could be used. The Tweets™ are first filtered through the keyword filter 302, which searches for text containing specific keywords. Following the keyword filter 302, a set of remaining $t_1$ Tweets™ are filtered through a future date filter 304, which keeps $t_1$ Tweets™ that comprise text containing future dates. A resulting set of $t_2$ Tweets™ are passed through a logistic regression classification module 306 to classify Tweets™ based on their relevance to a civil unrest event. The logistic regression classification module 306 is comprised of a standard logistic regression classifier 308 and a user-identification classifier 310. Following the logistic regression classification module 306, a set of resulting $t_3$ Tweets™ is passed through an event geocoding module 312 and a demographics module 314, resulting in a set of $t_4$ Tweets™ whose retweeters localize within nations of interest or whose text contains mentions of specific locations. The final output 316 is a history document which includes the Tweets™ used, the retweeter locations, the keywords matched, and links to all retweeter accounts. Each of these elements will be described in further detail below.

(3.1) Keyword Searches

The first filter (the keyword filter 302) that a Tweet™ (or other textual input) must pass is a simple check for mentions of civil unrest keywords. For the purposes of the present application, civil unrest events in Latin America are used as a non-limiting example. The advantage of this filter is that it is possible to apply it to the entirety of Twitter™ by using the public search application programming interface (API) (e.g., https://dev.twitter.com taken on Jun. 2, 2014). A collection of 26 keywords were manually identified as having substantial importance in the example presented, and the API was queried to obtain full coverage of these keywords.

Additionally, a set of 335 words related to Latin America civil unrest (e.g., Socialista, Protesta, Marchista) was identified by a domain expert for use in the system according to the principles of the present invention. Searching the public API for all occurrences of all 335 keywords is not possible, so searches for the set of 335 words was constrained to the 10% data sampling.

Thus, an example of the keyword filter process being applied to raw Twitter™ data each day is as follows. Read through each day's worth of data and collect Tweets™ containing both a civil unrest term (as defined by, for example, Latin America civil unrest domain experts) and a future date in Spanish/Portuguese, for example.

(3.2) Future Date Searches

An experiment indicated that, in both English and Spanish, only about 20% of Tweets™ that contain a civil unrest keyword were indeed about civil unrest. Furthermore, it was unclear how to forecast an event date from only Tweets™ with certain keywords. Therefore, a second filter (i.e., the future date filter 304) is applied, for mentions of future dates, to the Tweets™ containing civil unrest keywords.

The future date filter 304 searches first for month names and abbreviations in Spanish and Portuguese, and second for numbers less than 31 within three whitespace separated tokens from each other. Thus, an example matching date pattern would be "10 de enero". Four-digit years are rare in Tweets™, therefore, in order to determine the year of the mentioned date, the year which minimizes the number of days between the mentioned date and the tweet's post time is used. For instance, if a Tweet™ mentions "10 de enero" on 2012-12-29, it is assumed that the user is referring to 2013-01-10, as 2013-01-10 is closer in time to 2012-12-29 than 2012-01-10 is.

Date extraction from user entered text is done by regex (regular expression) identification of two adjacent digits with the possibility of a trailing ordinal symbol (e.g., "o" for Portuguese ordinals). Once digits have been identified, nearby words are checked for matches with Spanish/Portuguese month names.

The extracted date is then compared against the tweets'™ post time. Once dates are extracted from the text, it is asserted that the mentioned dates occur after the Tweets'™ post time. It is assumed that Tweets™ mentioning past dates are unlikely to be indicative of future events. When the future date filter 304 is applied, the number of Tweets™ is reduced substantially. Only Tweets™ containing future dates are retained. According to an experimental study performed on 144,167 Tweets™ containing civil unrest keywords collected from the Twitter™ API, it was found that only 1,512 of the Tweets™ also contained future dates. For each Tweet™ passing the future date filter, a forecast for the mentioned date is tentatively issued.

(3.3) Logistic Regression Classification Module 306

Co-mentions of keywords with future dates do not guarantee that a particular Tweet™ is indeed about civil unrest. Two classifiers were developed and designed to classify Tweets™ based on their relevance to a civil unrest event. The first classifier is a standard logistic regression text-document classifier 308 trained on Tweets™. In an experimental study, 3000 Tweets™ were annotated for their relevance to a civil unrest event.

The second classifier (i.e., the user-identification classifier 310) makes use of recent work establishing that civil unrest Tweets™ are three-times more likely to originate from organizations rather than individuals (see Literature Reference No. 2). For this classifier (i.e., the user-identification classifier 310), an ensemble framework for user type identification based on heuristics, an n-gram classifier, and a linguistic classifier is used (see Literature Reference No. 2 for a description of the classifiers). An n-gram is a contiguous sequence of n items from a given sequence of text or speech. The items can be phonemes, syllables, letters, words, or base pairs according to the application. After identifying the posting user as an individual or organization, the forecast probability is adjusted accordingly.

(3.4) Event Geocoding Module 312

Identification of event location is central to the system according to the present invention. The location of an upcoming event is inferred by searching the Tweet™ for mentions of cities or monuments from a manually compiled list. In the event that no locations are mentioned in the text, a location is assigned to an event based on the location of retweeters. For each Tweet™ passing the logistic regression filter described above, the Twitter™ API is queried for user IDs (identifications) of all of the Tweet's™ retweeters. The model according to the principles of the present invention assumes that the demographics most interested in the Tweet™ are well-represented by the retweeters. The model also assumes that retweeting provides an excellent content filter which is naturally done by Twitter's™ users. User IDs are then fed into a geocoder (described in detail below) and filtered based on whether or not they reside in Latin America (in this example). Note that this filter is remarkably difficult to pass. Of the 1,512 Tweets™ collected in the previous step of the described example, only 36 passed the Latin America geocoding filter. This is significant because 36 Tweets™ is a small enough amount of data that a single human can read them all.

It is assumed that civil unrest events tend to occur in population centers. Therefore, the geocoded users are reverse-geocoded into the nearest city with a population greater than 500,000 people. The most commonly occurring city is used as the location of the event.

Identification of retweeter locations is performed with a previously developed geocoder, as described in U.S. application Ser. No. 14/210,265, entitled, "Inferring the Location of Users in Online Social Media Platforms Using Social Network Analysis," which is hereby incorporated by reference as though fully set forth herein. A distinguishing feature of the geocoder is its ability to infer a user's location based on the locations of that user's social bonds. This is accomplished via a technique similar to label propagation (see Literature Reference No. 3 for a description of label propagation) applied to the Twitter™ bidirectional @mention network.

Briefly, the user geocoder works as follows. First, home locations for users are extracted based on the number of times they have Tweeted™ with GPS turned on. When the 10% data sample of Twitter™ contains three or more Tweets™ from a user within a 15 kilometer radius, the geometric median of those tagged Tweets™ is used to establish the user's home location. Denote the bidirectional @network by N and define a geometric median function ø: N→N according to the following:

$$\phi(n) = \begin{cases} n & \text{if } n \text{ is gps} - \text{known} \\ \min_x \sum_{n_i adj\ to\ n} d(n_i, x) & \text{else} \end{cases} \quad (1)$$

where each node n∈N stores information about the latitude/longitude for the user associated to that node. The distance function is computed with Vicenty's formulas (see Literature Reference No. 4). The optimization in equation (1) is known as the $l_1$ multivariate median or geometric median (Literature Reference No. 5)

(3.5) Demographics and Event Code Assignment

To assign a demographic to each forecast in the demographics module 314, the Tweet™ histories of every retweeter of every Tweet™ associated with a forecast are collected, and a search is performed of lists of terms relevant to several demographics and event types in Latin America. The most commonly occurring classes of terms were used to assign the forecast's demographic and event code. All retweeter histories are combined into one large history document, which is a history of what the participants have said online.

The history document is then classified as civil unrest/not civil unrest. The results are used to assign a probability score to this event. This is done by counting the probability that a word in the history document is one of the domain terms and mapping to [0,1] via tan h. In other words, the probability is assigned to tan h(number of domain terms/number of terms in the history document).

A population label is assigned by searching for words known to be of interest to certain populations. The population label is used for the population field in the warning. Examples of allowed populations are "General Population". "Education", "Labor", and "Agriculture". Then, a civil unrest subcode is assigned by searching for words known to be associated with a set of civil unrest subcodes. Non-limiting examples of allowed subcodes include "Employment and Wages", "Housing", "Energy and Resources", "Other Economic Policies", and "Other Government Policies".

Duplicate forecasts for the same date/location are condensed into one forecast comprising several Tweets™ by averaging their probabilities. The Tweets™ are saved as part of an audit trail.

By utilizing an approach based on early detection rather than prediction, the system according to the principles of the present invention can easily provide an audit trail which can be understood with minimal effort. For each forecast generated, the Tweets™ used, the retweeter locations, the keywords matched, and links to all retweeter accounts are provided.

The invention described herein is related to U.S. Non-Provisional application Ser. No. 14/210,265, entitled, "Inferring the Location of Users in Online Social Media Platforms Using Social Network Analysis," U.S. Provisional Application No. 61/809,160, entitled, "Inferring the Location of Users in Online Social Media Platforms Using Social Network Analysis," and U.S. Provisional Application No. 61/831,058, entitled, "Social Media Data Mining for Early Detection of Newsworthy Civil Unrest Events." which are all hereby incorporated by reference as though fully set forth herein.

What is claimed is:

1. A system for early detection of civil unrest events, the system comprising:
one or more processors and a non-transitory computer-readable medium having executable instructions encoded thereon such that when executed, the one or more processors perform operations of:
receiving a set of textual social media data having corresponding user identifications as input;
filtering the set of textual social media data with a keyword filter, resulting in a first set of data comprising keywords of interest;
filtering the first set of data with a future date filter, resulting in a second set of data comprising future dates;
filtering the second set of data based on relevance to a civil unrest event with a text classifier module, resulting in a third set of data that is classified based on relevance to the civil unrest event;
filtering the third set of data based on a location of interest, resulting in a fourth set of data having user identifications in the location of interest;
assigning a location to the civil unrest event; and
outputting a forecast of the civil unrest event.

2. The system as set forth in claim 1, wherein the forecast comprises a demographic of participants of the civil unrest event, a reason for the civil unrest event, a date the civil unrest event is forecast to occur on, a location where the civil unrest event is expected to occur, and a probability of how likely it is that the civil unrest event will occur.

3. The system as set forth in claim 2, wherein the text classifier module comprises a standard logistic regression classifier trained on the set of textual social media data.

4. The system as set forth in claim 3, wherein the text classifier module further comprises a user type identification classifier to determine whether a user identification is related to an individual or an organization, and wherein the one or more processors further perform an operation of increasing the probability of the civil unrest event occurring if the user identification is related to an organization.

5. The system as set forth in claim 4, wherein the one or more processors further perform an operation of searching the set of textual social media data for mentions of cities or monuments to assign a location to the civil unrest event.

6. The system as set forth in claim 5, wherein if there are no mentions of cities or monuments in the set of textual social media data, the one or more processors further perform an operation of assigning a location to the civil unrest event using a geocoding module that infers a location of a user identification based on a set of social media relationships within the set of textual social media data.

7. A computer-implemented method for early detection of civil unrest events, comprising:
an act of causing a data processor to execute instructions stored on a non-transitory memory such that upon execution, the data processor performs operations of:
receiving a set of textual social media data having corresponding user identifications as input;
filtering the set of textual social media data with a keyword filter, resulting in a first set of data comprising keywords of interest;
filtering the first set of data with a future date filter, resulting in a second set of data comprising future dates;
filtering the second set of data based on relevance to a civil unrest event with a text classifier module, resulting in a third set of data that is classified based on relevance to the civil unrest event;
filtering the third set of data based on a location of interest, resulting in a fourth set of data having user identifications in the location of interest;
assigning a location to the civil unrest event; and
outputting a forecast of the civil unrest event.

8. The method as set forth in claim 7, wherein the forecast comprises a demographic of participants of the civil unrest event, a reason for the civil unrest event, a date the civil unrest event is forecast to occur on, a location where the civil unrest event is expected to occur, and a probability of how likely it is that the civil unrest event will occur.

9. The method as set forth in claim 8, wherein the text classifier module comprises a standard logistic regression classifier trained on the set of textual social media data.

10. The method as set forth in claim 9, wherein the text classifier module further comprises a user type identification classifier to determine whether a user identification is related to an individual or an organization, and wherein the one or more processors further perform an operation of increasing the probability of the civil unrest event occurring if the user identification is related to an organization.

11. The method as set forth in claim 10, wherein the one or more processors further perform an operation of searching the set of textual social media data for mentions of cities or monuments to assign a location to the civil unrest event.

12. The method as set forth in claim 11, wherein if there are no mentions of cities or monuments in the set of textual social media data, the one or more processors further perform an operation of assigning a location to the civil unrest event using a geocoding module that infers a location of a user identification based on a set of social media relationships within the set of textual social media data.

13. A computer program product for early detection of civil unrest events, the computer program product comprising computer-readable instructions stored on a non-transitory computer-readable medium that are executable by a computer having a processor for causing the processor to perform operations of:
receiving a set of textual social media data having corresponding user identifications as input;
filtering the set of textual social media data with a keyword filter, resulting in a first set of data comprising keywords of interest;
filtering the first set of data with a future date filter, resulting in a second set of data comprising future dates;
filtering the second set of data based on relevance to a civil unrest event with a text classifier module, resulting in a third set of data that is classified based on relevance to the civil unrest event;
filtering the third set of data based on a location of interest, resulting in a fourth set of data having user identifications in the location of interest;
assigning a location to the civil unrest event; and
outputting a forecast of the civil unrest event.

14. The computer program product as set forth in claim 13, wherein the forecast comprises a demographic of participants of the civil unrest event, a reason for the civil unrest event, a date the civil unrest event is forecast to occur on, a location where the civil unrest event is expected to occur, and a probability of how likely it is that the civil unrest event will occur.

15. The computer program product as set forth in claim 14, wherein the text classifier module comprises a standard logistic regression classifier trained on the set of textual social media data.

16. The computer program product as set forth in claim 15, wherein the text classifier module further comprises a user type identification classifier to determine whether a user identification is related to an individual or an organization, and wherein the one or more processors further perform an operation of increasing the probability of the civil unrest event occurring if the user identification is related to an organization.

17. The computer program product as set forth in claim 16, further comprising instructions for causing the processor to perform an operation of searching the set of textual social media data for mentions of cities or monuments to assign a location to the civil unrest event.

18. The computer program product as set forth in claim 17, wherein if there are no mentions of cities or monuments in the set of textual social media data, the computer program product further comprises instructions for causing the processor to perform an operation of assigning a location to the civil unrest event using a geocoding module that infers a location of a user identification based on a set of social media relationships within the set of textual social media data.

19. The system as set forth in claim 1, wherein the one or more processors further perform an operation of assigning a probability score to the civil unrest event.

20. The system as set forth in claim 1, wherein the one or more processors further perform an operation of condensing duplicate forecasts into one forecast by averaging probabilities of how likely it is that the civil unrest event will occur.

21. The system as set forth in claim 1, wherein the text classifier module further comprises a user type identification classifier to determine whether a user identification is related to an individual or an organization, and wherein the one or more processors further perform an operation of increasing the probability of the civil unrest event occurring if the user identification is related to an organization.

22. The system as set forth in claim 1, wherein the one or more processors further perform an operation of searching the set of textual social media data for mentions of cities or monuments to assign a location to the civil unrest event.

23. The system as set forth in claim 1, wherein if there are no mentions of cities or monuments in the set of textual social media data, the one or more processors further perform an operation of assigning a location to the civil unrest event using a geocoding module that infers a location of a user identification based on a set of social media relationships within the set of textual social media data.

* * * * *